Patented Nov. 10, 1936

2,060,310

UNITED STATES PATENT OFFICE 2,060,310

PROCESS FOR THE PRODUCTION OF FERTILIZERS

Edward William Harvey, Highland Park, N. J., assignor to The Barrett Company, New York, N. Y., a corporation of New Jersey No Drawing. Application July 18, 1932,
Serial No. 623,283

8 Claims. (Cl. 71—43)

This invention relates to the production of fertilizers. More particularly, this invention relates to the production of a nitrogen-phosphorous fertilizer by the treatment of a material containing superphosphate with ammonia.

When a material containing superphosphate is treated with liquid anhydrous ammonia, the product has a tendency to be in powdered form. This powdery condition of the fertilizer is disadvantageous since it renders the material difficult to handle and distribute in the field. This disadvantage in the use of liquid ammonia is particularly important when a relatively large amount of ammonia is added to the superphosphate. Further, as the quantity of ammonia employed is increased the amount of reversion of the superphosphate caused by reaction with the ammonia increases.

It is an object of this invention, therefore, to provide a process for the treatment of superphosphate materials with ammonia whereby the ammonia may be rapidly and economically reacted with the phosphate to produce a fertilizer of desirable physical characteristics, being suitably dry yet having a granular form. It is a further object of this invention to provide a process whereby superphosphate material may be treated with ammonia in relatively large amounts and the reversion, due to the ammoniation treatment, limited.

In producing a fertilizer product employing the process of this invention, a superphosphate material may be treated with ammonia in the presence of about one part of total water for about 0.25 to 0.55 part of ammonia by weight. The process of this invention may, for example, be carried out by adding to a superphosphate containing about 10% water, for example, both ammonia and water in the proportions of between about 20 to 60 parts of water for every 80 to 40 parts of ammonia. The ammonia is preferably supplied as liquid ammonia or as concentrated aqua ammonia and in amount such that more than about two mols of ammonia are available for reaction with every one mol. of water soluble phosphoric acid present in the superphosphate material either as free phosphoric acid, $H_3PO_4$, or as monocalcium acid phosphate, $CaH_4(PO_4)_2$, which may be considered as comprising one mol. of dicalcium phosphate, $CaHPO_4$, and one mol. of acidic phosphoric acid, $H_3PO_4$. Thus, in carrying out the process of this invention, the superphosphate material may be simultaneously treated with liquid anhydrous ammonia and water or aqua ammonia separately conveyed to the material preferably as a spray applied to the material while it is agitated in a mixing device; or streams of liquid anhydrous ammonia and water or aqua ammonia may be mixed and the resulting liquid conveyed to the material; or the phosphate material may be treated with a liquid comprising both ammonia and water.

For a fuller understanding of the nature and objects of this invention, reference should be had to the following examples of methods for the preparation of fertilizers in accordance with the invention:

*Example I.*—A liquid containing about equal proportions of ammonia and water is prepared by adding anhydrous liquid ammonia to aqua ammonia containing, for example, 25% to 35% $NH_3$. This liquid is mixed with a commercial superphosphate containing about 18% available $P_2O_5$ and about 10% water in the proportions of about 200 lbs. of the liquid to every 1800 lbs. of the superphosphate. The proportions of material thus used in preparing this fertilizer are equivalent to adding to the superphosphate about 5.5 parts of ammonia to every 100 parts of superphosphate, or about 2.4 mols of ammonia for every one mol. of $H_3PO_4$ in the superphosphate. The ratio of total water present (both that in the superphosphate and that added with the ammonia) to ammonia used in preparing the fertilizer of this example is about 1 to 0.36.

*Example II.*—A mixture of the following materials is prepared:

| | Pounds |
|---|---|
| Superphosphate | 900 |
| Sulfate of ammonia | 52 |
| Manure salts | 267 |
| Filler (sand) | 673 |
| | 1,892 |

To this mixture is added and incorporated therewith about 108 lbs. of a liquid containing about equal proportions of ammonia and water such as was employed in preparing the fertilizer of Example I above. In this example, using a superphosphate containing 18% available $P_2O_5$, the superphosphate and ammonia are in the proportions of about 6 parts of ammonia for every 100 parts of superphosphate, equivalent to about 2.6 mols of $NH_3$ for every one mol. of $H_3PO_4$. The ratio of total water to ammonia is about 1 to 0.37.

*Example III.*—A superphosphate containing about 7% water and about 19.9% available $P_2O_5$ of which about 19% is water soluble, is admixed with 45% aqua ammonia in the proportions of about 8.9 parts of aqua ammonia for every 40 parts of the superphosphate. The proportions of materials used in preparing this fertilizer are equivalent to adding to the superphosphate about 4 mols. of ammonia for every one mol. of water soluble $H_3PO_4$. The ratio of total water to ammonia is about 1 to 0.52.

*Example IV.*—A superphosphate, such as is used in Example I above, is introduced into a rotating drum and is simultaneously sprayed with anhydrous liquid ammonia and water in about equal proportions, the ammonia and water may be sprayed upon the superphosphate from separate spray heads, or streams of liquid anhydrous ammonia and of water may be united and discharged onto the material from a single spray head. When the superphosphate has been thus treated with about 5.5 parts of ammonia for every 100 parts of superphosphate, the addition of the ammonia and water is discontinued and the product withdrawn from the mixing drum. The ratio of total water to ammonia employed is about 1 to 0.36.

By employing both ammonia in liquid form and water for the treatment of a superphosphate material in accordance with this invention, the ammonia is rapidly and completely absorbed by the phosphate material to produce a granular product. By limiting the amount of water in accordance with the present invention, a granular material may be directly produced in a commercially dry form. The presence of the water, in proper amount, however, cooperates with the use of the ammonia in liquid form to limit the temperatures attained as a result of the reaction of the ammonia and the superphosphate.

The agricultural availability of $P_2O_5$ in phosphate fertilizers may be determined by digesting the water-insoluble residue from a one-gram sample of the fertilizer for one hour in 100 cc. of neutral ammonium citrate solution containing 21.8 grams of ammonium citrate per 100 cc. of solution. The insoluble material is separated from the solution and the sum of the amounts of $P_2O_5$ in the solutions in water and in ammonium citrate is analytically determined. The water- and citrate-soluble portions of $P_2O_5$ are considered available as plant food. I have found that by treating a superphosphate material with ammonia, in the presence of water and in the proportions of ammonia, water and water-soluble phosphoric acid in the phosphate material as herein set forth, the amount of reversion caused by the ammonia is less than in a process, for example, wherein commercial superphosphate containing about 10% water is treated with anhydrous liquid ammonia. This limiting of the reversion of the $P_2O_5$ is a commercially important advantage of the process of this invention.

Since certain changes and modifications may be made in the manner of carrying out the above processes without departing from the scope of the invention, it is intended that all matter contained in the above description shall be interpreted as illustrative and not in a limiting sense. While it is preferred to employ the ammonia and water in about equal proportions for addition to superphosphate, the invention contemplates the addition of these materials in the proportions of between about 20 to 60 parts of water for every 80 to 40 parts of ammonia. Furthermore, the proportions of ammonia and superphosphate may be varied. It is preferred, however, to employ an amount of ammonia such that between about 4 to 6.5 parts of ammonia are available for reaction with every 100 parts of the usual superphosphate of commerce.

In treating a commercial superphosphate which contains about 10% water with 4 to 6.5 parts of ammonia and with water, and adding the ammonia and water in the proportions of 20 to 60 parts added water for every 80 to 40 parts of ammonia, the ratio of total water present (including both that added with the ammonia and that contained in the superphosphate) to ammonia will be about 1 part of water to about 0.25 to 0.55 part of ammonia by weight. When the amount of ammonia used is in the lower range of 4 to 6.5 parts of ammonia to every 100 parts of superphosphate, it is preferred to treat the superphosphate with ammonia in the presence of an amount of water corresponding to the larger ratios of the range 1 part water to 0.25 to 0.55 part of ammonia. Conversely, with increased amounts of ammonia to superphosphate, it is preferred to employ the smaller ratios of the above range. In terms of the ratio of added ammonia to added water, with increasing proportions of ammonia to superphosphate, it is preferred to employ the smaller ratios of the proportions of water to ammonia of the range 20 to 60 parts of water to 80 to 40 parts of ammonia.

As in the case of Example II, above, the superphosphate may be admixed with other materials when treated with the ammonia such as calcium, sodium, ammonium or potassium carbonate or carbamate, urea, urea nitrate, ammonium sulfate, etc. Or one or more of these materials may be introduced into the fertilizer product by dissolving it in the ammonia liquor and the solution added to the superphosphate material or by admixing with the superphosphate an aqueous solution of one or more of these materials and simultaneously or subsequently treating the mixture with ammonia. The moisture content of these added materials in a dry-to-the-touch condition, is not effective in obtaining the results of this invention and is not a part of the total water of the ratios of water and ammonia herein set forth. An excess of water which appears as perceptible moisture on the added materials, however, is equivalent to the moisture content of the phosphate itself or to water added with the ammonia, and is comprised in the specified ratios of total water and ammonia and is water effectively "present" in the treatment of the phosphate with the ammonia.

I claim:

1. The process for the production of a fertilizer which comprises treating a monocalcium acid phosphate-containing material with aqua ammonia of about 40% to 80% strength in amount such that more than about two mols of ammonia are available for reaction with every one mol. of water soluble phosphoric acid in said material.

2. The process for the production of a fertilizer which comprises treating superphosphate with more than about two mols of ammonia for every one mol. of water soluble phosphoric acid in said superphosphate and in the presence of about one part of water for about 0.25 to 0.55 part of ammonia.

3. The process for the production of a fertilizer which comprises treating superphosphate with about equal proportions of ammonia in liquid form and water and in amount about 5.5 parts of ammonia for every 100 parts of superphosphate.

4. The process for the production of a fertilizer which comprises treating a superphosphate containing about 10% water with about 40% to 80% aqua ammonia in amount such that about 4 to 6.5 parts of ammonia are available for reaction with every 100 parts of said superphosphate.

5. The process for the production of a fertilizer which comprises treating superphosphate with ammonia in amount such that about 4 to 6.5 parts of ammonia are available for reaction with every 100 parts of said superphosphate and in the presence of about one part of water for about 0.25 to 0.55 part of ammonia.

6. In a process for the production of a fertilizer by the treatment of a superphosphate with ammonia in amount such that about 4 to 6.5 parts of ammonia are available for reaction with every 100 parts of said superphosphate, the improvement which comprises adding to said superphosphate at least a portion of the aforesaid ammonia as liquid anhydrous ammonia and also treating the superphosphate with water in the proportions of about 20 to 60 parts of water for every 80 to 40 parts of ammonia added to the superphosphate.

7. In a process for the production of a nitrogen-phosphate fertilizer containing a high proportion of nitrogen by the treatment of superphosphate with ammonia, the improvement which comprises reacting liquid anhydrous ammonia with a superphosphate containing below 4 parts of ammonia for every 100 parts of superphosphate until the ammonia combined with the superphosphate amounts to 4 to 6.5 parts of ammonia for every 100 parts of superphosphate and adding water to the superphosphate in amount such that the liquid anhydrous ammonia reacts with the superphosphate in the presence of about one part of water for about 0.25 to 0.55 part of total ammonia with which the superphosphate is treated.

8. In a process for the production of a nitrogen-phosphate fertilizer containing a high proportion of nitrogen by the treatment of superphosphate with ammonia, the improvement which comprises mixing and reacting liquid anhydrous ammonia with a superphosphate containing below 4 parts of ammonia for every 100 parts of superphosphate until the ammonia combined with the superphosphate amounts to 4 to 6.5 parts of ammonia for every 100 parts of superphosphate and prior to the completion of the mixing of the superphosphate with the liquid anhydrous ammonia adding water to the superphosphate in the proportions of about 20 to 60 parts of water for every 80 to 40 parts of total ammonia added to the superphosphate.

EDWARD WILLIAM HARVEY.